United States Patent
Mizutani et al.

(10) Patent No.: US 8,760,963 B2
(45) Date of Patent: Jun. 24, 2014

(54) SYNCHRONOUS RECORDING SYSTEM AND SYNCHRONOUS RECORDING METHOD

(75) Inventors: Koji Mizutani, Kanagawa (JP); Yuto Konno, Kanagawa (JP)

(73) Assignee: Mitutoyo Corporation, Kanagawa (JP)

( * ) Notice: Subject to any disclaimer, the term of this patent is extended or adjusted under 35 U.S.C. 154(b) by 453 days.

(21) Appl. No.: 12/794,856

(22) Filed: Jun. 7, 2010

(65) Prior Publication Data

US 2010/0309747 A1    Dec. 9, 2010

(30) Foreign Application Priority Data

Jun. 8, 2009    (JP) ................. 2009-137031

(51) Int. Cl.
*G01V 1/00*    (2006.01)
*G01V 1/16*    (2006.01)
*G01V 1/22*    (2006.01)
*G01V 1/24*    (2006.01)

(52) U.S. Cl.
CPC ... *G01V 1/16* (2013.01); *G01V 1/22* (2013.01); *G01V 1/24* (2013.01)
USPC .............................. 367/14; 367/79

(58) Field of Classification Search
CPC ............. G01V 1/16; G01V 1/22; G01V 1/23; G01V 1/26
USPC .......... 181/107, 110, 118; 346/33 C; 367/19, 367/23, 38, 55, 68, 76, 77, 14; 175/40, 50
See application file for complete search history.

(56) References Cited

U.S. PATENT DOCUMENTS

| | | | | |
|---|---|---|---|---|
| 4,227,198 | A * | 10/1980 | Preskitt et al. | 346/33 C |
| 5,822,273 | A * | 10/1998 | Bary et al. | 367/77 |
| 5,978,313 | A * | 11/1999 | Longaker | 367/38 |
| 7,269,095 | B2 * | 9/2007 | Chamberlain et al. | 367/76 |
| 7,359,282 | B2 * | 4/2008 | Tulett | 367/23 |
| 8,069,932 | B2 * | 12/2011 | Kamata | 175/50 |

FOREIGN PATENT DOCUMENTS

JP    2001-215283    8/2001

* cited by examiner

*Primary Examiner* — Isam Alsomiri
*Assistant Examiner* — Daniel L Murphy
(74) *Attorney, Agent, or Firm* — Greenblum & Bernstein, P.L.C.

(57) ABSTRACT

A synchronous recording system is configured with a first seismograph and a second seismograph. The first seismograph includes a sensor, a GPS receiver, a data buffer, and a synchronous information transmission program that transmits synchronous information to the second seismograph, the information designating recording start time. The second seismograph includes a sensor, a GPS receiver, a data buffer, a recorder, a synchronous information reception program that receives the synchronous information, and a recording control program that starts, based on the synchronous information, recording in the recorder of oscillation data, which is recorded in the data buffer, from the designated recording start time.

4 Claims, 6 Drawing Sheets

SYNCHRONOUS RECORDING SYSTEM AND SYNCHRONOUS RECORDING METHOD

CROSS-REFERENCE TO RELATED APPLICATIONS

The present application claims priority under 35 U.S.C. §119 of Japanese Application No. 2009-137031, filed on Jun. 8, 2009, the disclosure of which is expressly incorporated by reference herein in its entirety.

BACKGROUND OF THE INVENTION

1. Field of the Invention

The present invention relates to a synchronous recording system and a synchronous recording method.

2. Description of Related Art

A related art recording apparatus, e.g., seismograph, has a function to perform time calibration through use of a global positioning system (GPS), as generally discussed in Japanese Patent Laid Open Application No. 2001-215283, for example. In addition, a related art system connects a plurality of such recording apparatuses in order to effectively perform measurement at a plurality of locations.

In such a system connecting a plurality of recording apparatuses, all of the apparatuses used are normally time-calibrated through use of a GPS or a time announcement signal. This is because, without internal clocks in the apparatuses being synchronized with the absolute time, the difference between the absolute time and the internal clocks becomes larger as the time goes by, and it becomes necessary to calibrate the internal clocks and to correct times after collecting the measured data. Further, all of the recording apparatuses after time calibration are synchronized for recording, by directly connecting the apparatuses using the synchronization signal of hardware.

However, with the above-described related art synchronization method, the synchronization signal which connects two recoding apparatuses A and B, for example, is a hardware signal, thereby having a limitation in distance for connecting the two recording apparatuses A and B and susceptible to external disturbances such as noise in the transmission path. Further, in the above-described synchronization method, it is difficult to have a perfect synchronization. In particular, as shown in FIG. 6, since there is a delay in the transmission path where the synchronization signal is transmitted from the recording apparatus A to the recording apparatus B, or a delay in processing at the reception side, a difference is caused between recording initiation location $T_b$ of the recording apparatus B and recording initiation location $T_a$ of the recording apparatus A, i.e., $\Delta T = T_b - T_a$. In other words, the synchronization is performed only from recording from the time of receiving the synchronization signal, thereby causing a limitation in time.

SUMMARY OF THE INVENTION

A non-limiting feature of the present disclosure provides a synchronous recording system and a synchronous recording method that are capable of performing perfect synchronized recording, regardless of a distance between apparatuses.

A first non-limiting aspect of the present disclosure provides a synchronous recording system including: a first recording apparatus, and one or more second recording apparatuses, each apparatus being connected to the first recording apparatus through a communication line. The first recording apparatus may include a first oscillation detector that detects oscillation as oscillation data, a first time receiver that receives time information, a first data buffer that adds the time information to the oscillation data and records the data, and a synchronous information transmitter that transmits synchronous information to the second recording apparatus, the information designating a recording start time. The second recording apparatus may include a second oscillation detector that detects oscillation as oscillation data, a second time receiver that receives time information, a second data buffer that adds the time information to the oscillation data and records the data, an involatile recorder that records oscillation data recorded in the second data buffer, a synchronous information receiver that receives the synchronous information transmitted from the synchronous information transmitter, and a recording controller that starts recording of the oscillation data in the recorder from the designated recording start time, the data being recorded in the second data buffer, based on the synchronous information received by the synchronous information receiver.

In addition, a second non-limiting aspect of the present disclosure provides the synchronous recording system according to the non-limiting first aspect of the disclosure. Each of the first recording apparatus and the second recording apparatus may include a timer and a time calibrator that calibrates time of the timer based on the time information received by one of the first time receiver and the second time receiver.

Further, a third non-limiting aspect of the present disclosure provides a synchronous recording method according to the synchronous recording system of one of the first and second aspects of the disclosure. The method may include transmitting synchronous information from the first recorder to the second recorder, the information designating time of detecting oscillation at or above a predetermined level as a recording start time, receiving, by the second recorder, the transmitted synchronous information, and recording the oscillation data in the recorder from the designated recording start time, the data being recorded in the second data buffer, based on the received synchronous information.

According to a non-limiting aspect of the present disclosure, the recording start time is designated by the synchronous information. Therefore, it is possible to easily synchronize recording and obtain recording that is perfectly synchronous, thereby attaining the high accuracy of the system. Further, since the data within the data buffer is used, and thereby eliminates the adverse effect of the transmission delay, the distance limitation between the apparatuses is eliminated. Therefore, it is possible to improve usability. In addition, since the data within the data buffer is used, it is possible to obtain synchronized recording retrospectively. Furthermore, since the recording is started by the synchronous information, the effect of noise is prevented, unlike the sigma thereby improving the system reliability.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The synchronous recording system according to a non-limiting aspect of the present invention is described in the following, with reference to the drawings wherein like characters represent like elements.

Figure 1:
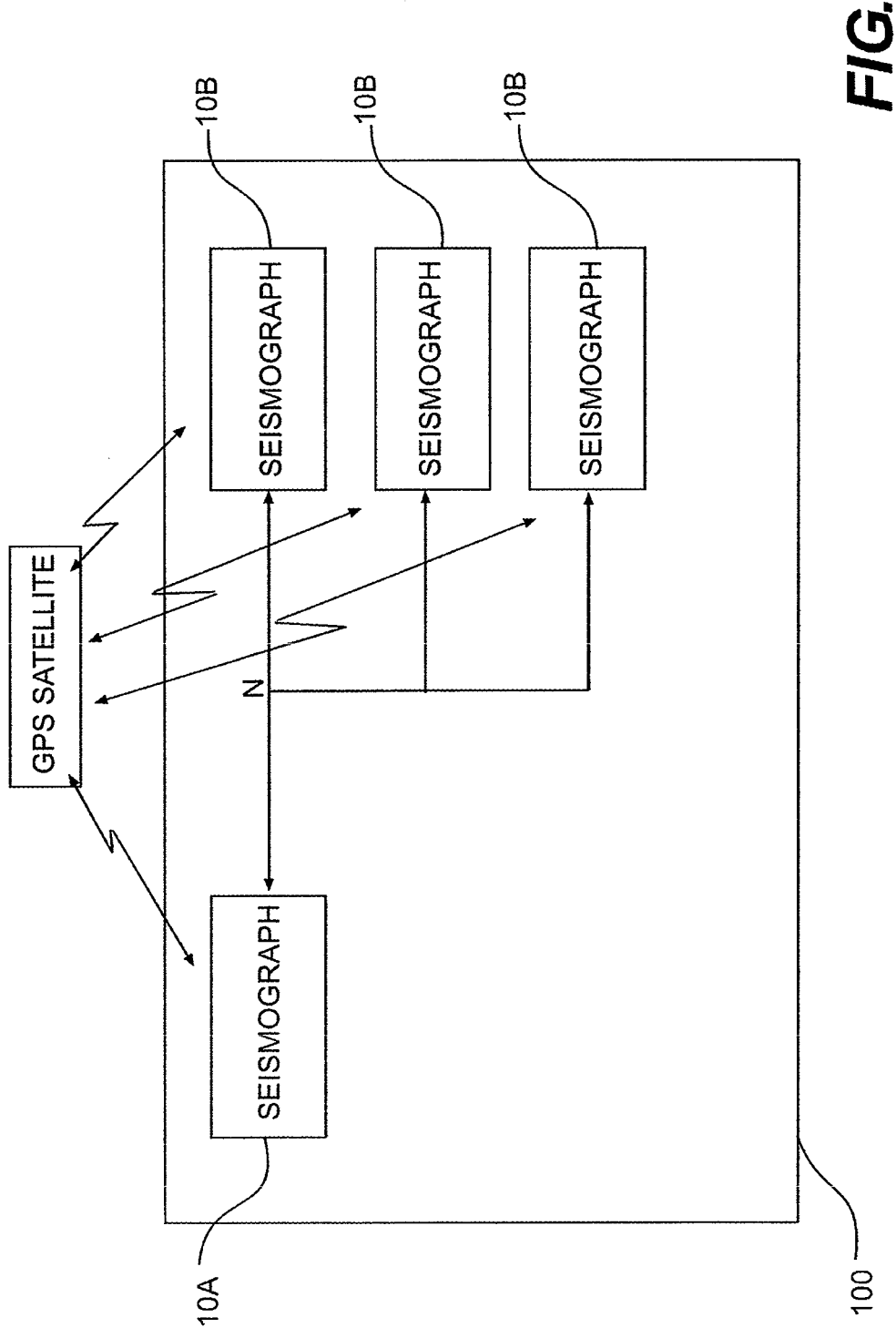
FIG. 1 illustrates a configuration of a synchronous recording system according to an embodiment of the present invention.

FIG. 1 illustrates a configuration of a synchronous recording system according to a non-limiting embodiment of the present invention. As shown in FIG. 1, a synchronous recording system 100 includes a seismograph 10A as a first recording apparatus, a seismograph 10B as a second recording apparatus . . . and so on. The seismographs 10A and 10B are connected through a communication line N, such as a telephone line, the Internet, or other suitable electronic method communication. In the following explanation, the seismograph 10A is a seismograph closest closet to a seismic center, and the seismograph 10B is located further away from the seismic center than the seismograph 10A.

Figure 2:
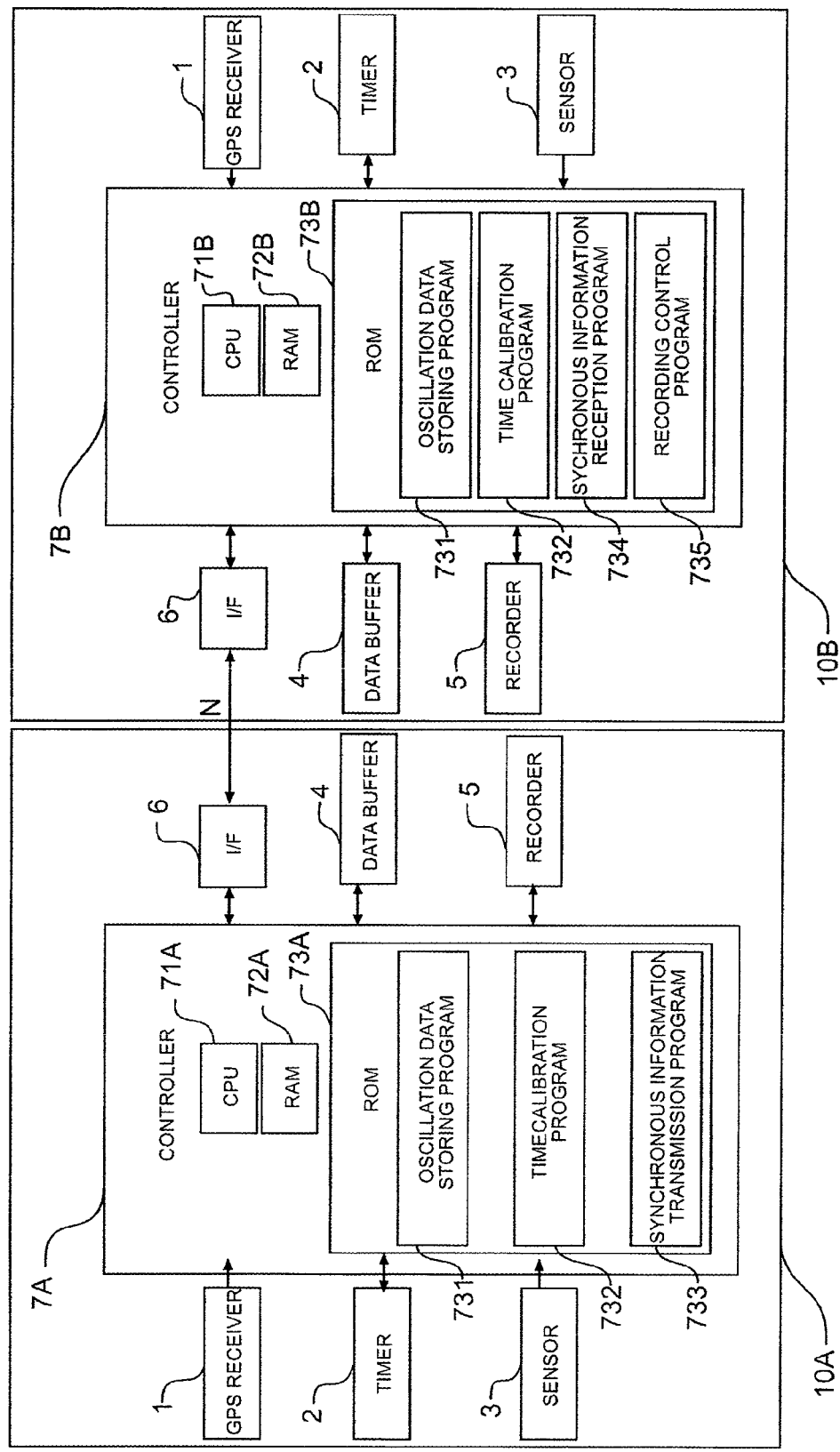
FIG. 2 is a block diagram illustrating a configuration of control in the synchronous recording system.

FIG. 2 is a block diagram illustrating a configuration of control in the seismographs 10A and 10B. First, the configuration of the seismograph 10A is illustrated. The seismograph 10A is configured with a GPS receiver 1, a timer 2, a sensor 3, a data buffer 4, a recorder 5, an interface 6, a controller 7A, and the like.

The GPS receiver 1 is generally configured with a GPS antenna, a GPS receiver device, and the like. The GPS receiver 1 receives time information as a first time receiver. Specifically, the GPS antenna receives a GPS signal transmitted from a GPS satellite G, and outputs the received GPS signal to the GPS receiving device. The GPS receiving device retrieves time information, location information, and the like from the GPS signal input from the GPS antenna, and outputs the same to the controller 7A.

The timer 2 includes an oscillation circuit, for example. The timer 2 counts time signals input from the oscillation circuit, obtains current time data and the like, and outputs the current time data to the controller 7A as a current time signal. In addition, the timer 2 periodically performs current time calibration based on a time calibration signal for time calibration, which is generated based on the time information periodically input (e.g., every second or other suitable time period) from the GPS receiver 1. The timer 2 then outputs to the controller 7A a time signal of the correct current time.

The sensor 3 is configured with an accelerometer and the like, for example. As a first oscillation detector, the sensor 3 detects an electric signal indicating oscillation at a location where the seismograph 10A is located, converts the detected electronic signal from analog to digital, and continuously outputs to the controller 7A the signal as an oscillation detection signal.

Figure 3:
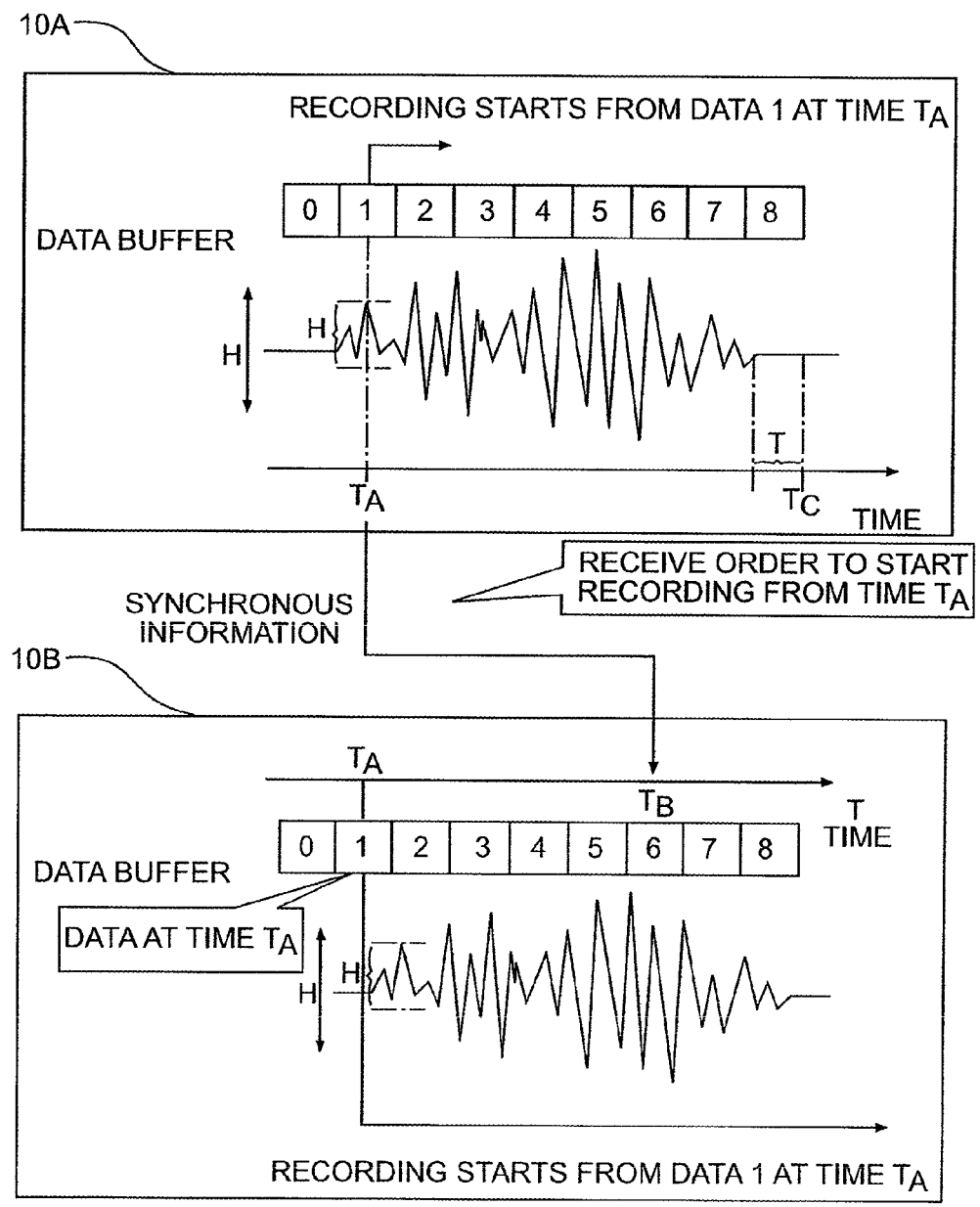
FIG. 3 illustrates a recording start time.

Data buffer 4 records oscillation data in association with time data. Specifically, the data buffer 4 records the "oscillation data" from the location of the seismograph 10A in association with the "current time data," based on the oscillation detection signals and the current time signals continuously input from the controller 7A. For example, as shown in FIG. 3, when the current time (T) is $T=T_a$, the time "$T_a$" and data "1" within the data buffer 4 are recorded in association with each other. The data "1" is recorded as oscillation data for an oscillation value (h). In other words, the data buffer 4 stores oscillation data with added time data.

The recorder 5 is configured with an involatile memory, such as a magnetic/optical recording medium, semiconductor memory, or other suitable memory. When the sensor 3 detects oscillation at a predetermined threshold or above, oscillation data based on the electric signals related to the detected oscillation is recorded in sequence. Alternatively, the recorder 5 may be configured with a hard disk drive, memory card or other suitable memory, which may be detachably attached.

The interface 6 inputs and outputs signals and data from/to the seismograph 10B. The interface 6 is configured with a serial input/output terminal (e.g., USB (Universal Serial Bus) port, RS-485C terminal, or any other suitable input/output terminal), a parallel input/output terminal, an SCSI interface or any other suitable interface, and is capable of digitally communicating with the seismograph 10B through a communication line N, as part of a synchronous information transmitter.

The controller 7A includes a CPU 71a, a RAM 72a, a ROM 73a, and the like as shown in FIG. 2. The controller 7A is connected, through a system bus and the like, to the GPS receiver 1, the timer 2, the sensor 3, the data buffer 4, the recorder 5, the interface 6, and the like.

The CPU 71a performs various control operations according to various processing programs stored in the ROM 73a, for example.

The RAM 72a configures a work memory area that stores data calculated by the CPU 71a.

The ROM 73a stores system programs executable by the CPU 71a, various processing programs executable by the system programs, data used when executing these various processing programs, data resulted from the various processing computed by the CPU 71a, and the like. The programs are stored by the ROM 73a in program codes readable by the computer.

More specifically, the ROM 73a stores an oscillation data storing program 731, a time calibration program 732, a synchronous information transmission program 733, and the like.

The oscillation data storing program 731 enables, for example, the CPU 71a to store oscillation data with added time information (data) in the data buffer 4. Particularly, the CPU 71a executes the oscillation data storing program 731, and stores, when the sensor 3 detects oscillation data, the oscillation data in association with time information in the data buffer 4, the time information being timed by the timer 2 and indicating when the oscillation data is detected.

The time calibration program 732 enables, for example, the CPU 71a to calibrate current time of the timer 2, in accordance with the time based on the time information received by the GPS receiver 1. Specifically, the CPU 71a executes the time calibration program 732 and periodically performs current time calibration of the timer 2, based on the time information periodically input (e.g., every second) from the GPS receiver 1. More specifically, the CPU 71a compares, when receiving the time information from the GPS receiver 1, the received time information against the current time of the timer 2. When there is any discrepancy in time, the CPU 71a generates a time calibration signal and outputs the signal to the timer 2, so that the current time of the timer 2 is calibrated based on the time calibration signal. In addition, the CPU 71a continuously outputs, to the data buffer 4, the calibrated current time as a time signal indicating the current time. Accordingly, the CPU 71a has a time calibration function that executes the time calibration program 733 as described above.

The synchronous information transmission program 733 is a program that enables the CPU 71a to output, to the seismograph 10B, synchronous information that designates recording start time. The synchronous information is information that designates recording start time in order to match recording starting times of the seismograph 10A and 10B. In particular, the CPU 71a executes the synchronous information transmission program 733 and generates, when the oscillation data value is at a predetermined threshold or above, synchronous information designating time information of when the threshold value has been reached as the recording start time. As shown in FIG. 3, for example, when the oscillation data reaches a predetermined value H (in this case, data "1"), the CPU 71a refers to the data buffer 4, designates a time T corresponding to the data as the recording start time (T=$T_a$, in this example), and generates synchronous information. Then, the CPU 71a transmits the synchronous information to the seismograph 10B through the interface 6. When the oscillation data is above the predetermined threshold, the time T corresponding to the data (T=$T_a$, in this example) is regarded as the recording start time, thereby causing the recorder 5 of the seismograph 10A to start recording. The CPU 71a has a synchronous information transmission function together with the interface 6, which executes the synchronous information transmission program 733.

The configuration of the seismograph 10B is illustrated as follows. The components similar to the ones of the seismograph 10A are provided with the identical numerical characters, therefore the illustration thereof is omitted.

The seismograph 10B is configured with a GPS receiver 1, a timer 2, a sensor 3, a data buffer 4, a recorder 5, a interface 6, a controller 7B, and the like. The GPS receiver 1 of the seismograph 10B is a second time receiver. The timer 2 of the seismograph 10B is a second oscillation detector. The recorder 5 of the seismograph 10B is a recorder.

The controller 7B includes a CPU 71b, a RAM 72b, and a ROM 73b as shown in FIG. 2. The controller 7B is connected, via a system bus and the like, to the GPS receiver 1, the timer 2, the sensor 3, the data buffer 4, the recorder 5, the interface 6, and the like of the seismograph 10B.

The CPU 71b performs various control processes according to various processing programs stored in ROM 73b, for example. The RAM 72b configures a work memory area that stores data calculated by the CPU 71b.

The ROM 73b stores various programs and the like executable by the CPU 71b, for example. Specifically, the ROM 73b stores, for example, an oscillation data storing program 731, a time calibration program 732, a synchronous information reception program 734, a recording control program 735, and the like. The oscillation data storing program 731 and the time calibration program 732 are similar programs to the ones stored in the ROM 73a of the seismograph 10A.

The synchronous information reception program 734 enables the CPU 71b to receive synchronous information transmitted from the interface 6 of the seismograph 10A. In particular, the CPU 71b executes the synchronous information reception program 734 and receives synchronous information from the interface 6, the information designating recording start time and being generated and transmitted according to execution of the synchronous information transmission program 733 of the seismograph 10A. The CPU 71b has a synchronous information reception function that executes the synchronous information reception program 734.

The recording control program 735 enables the CPU 71b to start recording oscillation data in the recorder 5 from the designated recording start time, the data being stored in the data buffer 4, for example. In particular, the CPU 71b executes the recording control program 735 and searches for the designated recording start time from the stored data in the data buffer 4, in accordance with the received synchronous information. Then, the CPU 71b starts recording in the recorder 5, by setting the oscillation data as 0 point that corresponds to the designated recording start time. For example, when the designated recording start time is $T_a$ as shown in FIG. 3, the CPU 71b starts recording of oscillation data at the time point $T_a$ (data "1") even though the actual time is $T_b$ ($T_a$<$T_b$). The CPU 71b has a record control function that executes the record control program 735.

Figure 4:
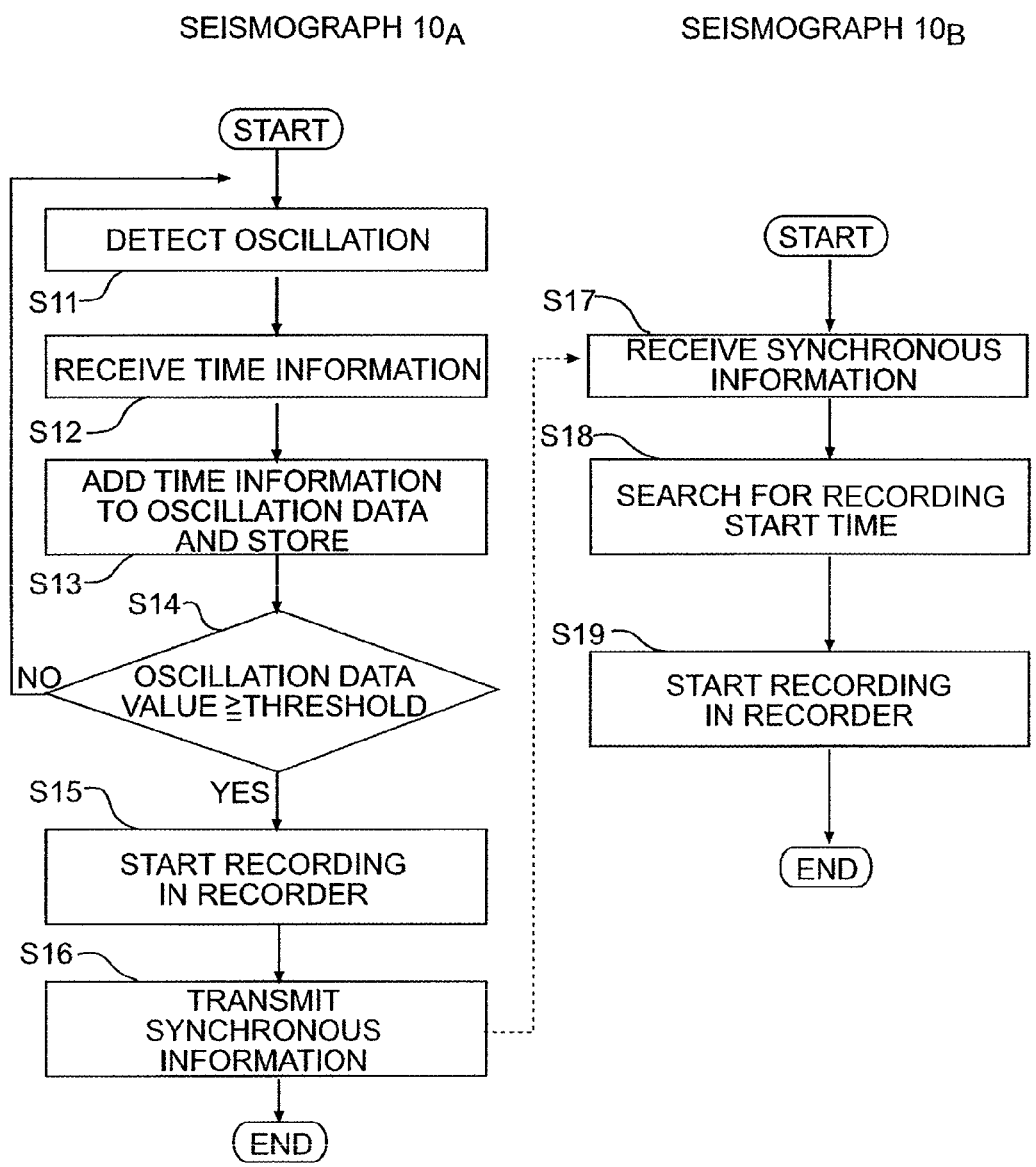
FIG. 4 is a flowchart illustrating a flow of a synchronous recording process.

Next, the operation of the synchronous recording system according to an embodiment of the present invention is illustrated as follows. FIG. 4 is a flowchart illustrating a synchronous recording process executed by the synchronous recording system 100 according to the embodiment of the present invention. In the following process, steps S11-S16 are executed by the seismograph 10A, whereas steps S17-S19 are executed by the seismograph 10B.

When the synchronous recording process is started, the controller 7A of the seismograph 10A detects oscillation through the sensor 3, at step S11. Then, at step S12, the controller 7A receives time information from the GPS receiver 1. At step S13, the controller 7A adds time information data to the oscillation data and records the same in data buffer 4. At step S14, the controller 7A determines whether the oscillation data value is at a predetermined threshold or above. When it is below the threshold level (step S14; NO), the control returns to step S11 to repeat the following process. When the oscillation data is at the threshold level or above (step S14; YES), the controller 7A generates, at the following step S15, synchronous information by setting time information as recording start time, the time information indicating the point of time when the oscillation data is at the threshold level or above, and starts recording in the recorder 5. Then, at step S16, the controller 7A transmits, through the interface 6, the synchronous information designating the recording start time to the seismograph 10B.

Then, the controller 7B of the seismograph 10B receives the synchronous information through the interface 6 at step S17. The controller 7B searches the data stored in the data buffer 4 for the recording start time at step S18. The controller 7B starts recording in the recorder 5 from the oscillation data of the designated recording start time, and ends the process.

Figure 5:
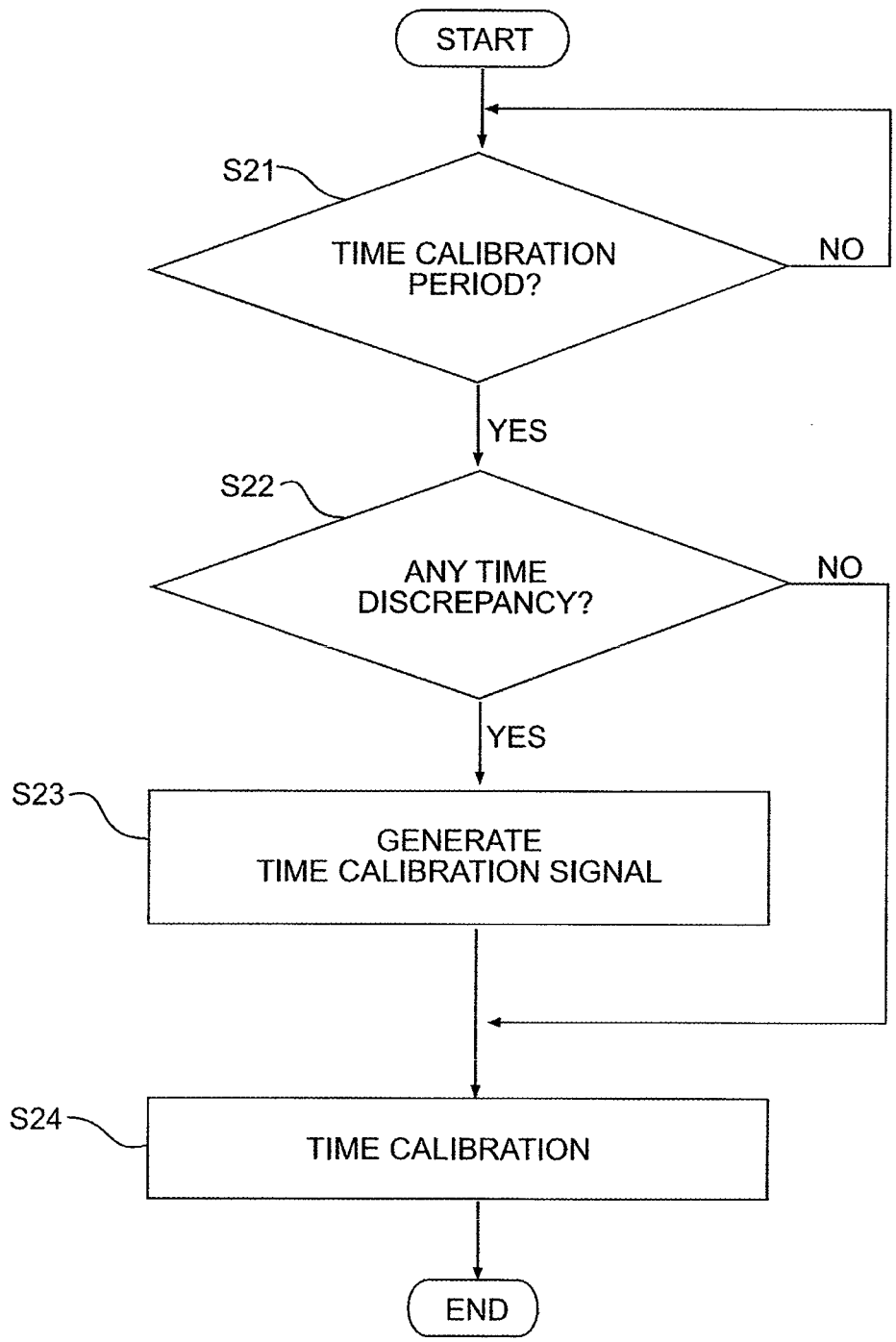
FIG. 5 is a flowchart illustrating a flow of a time calibration process.
Figure 6:
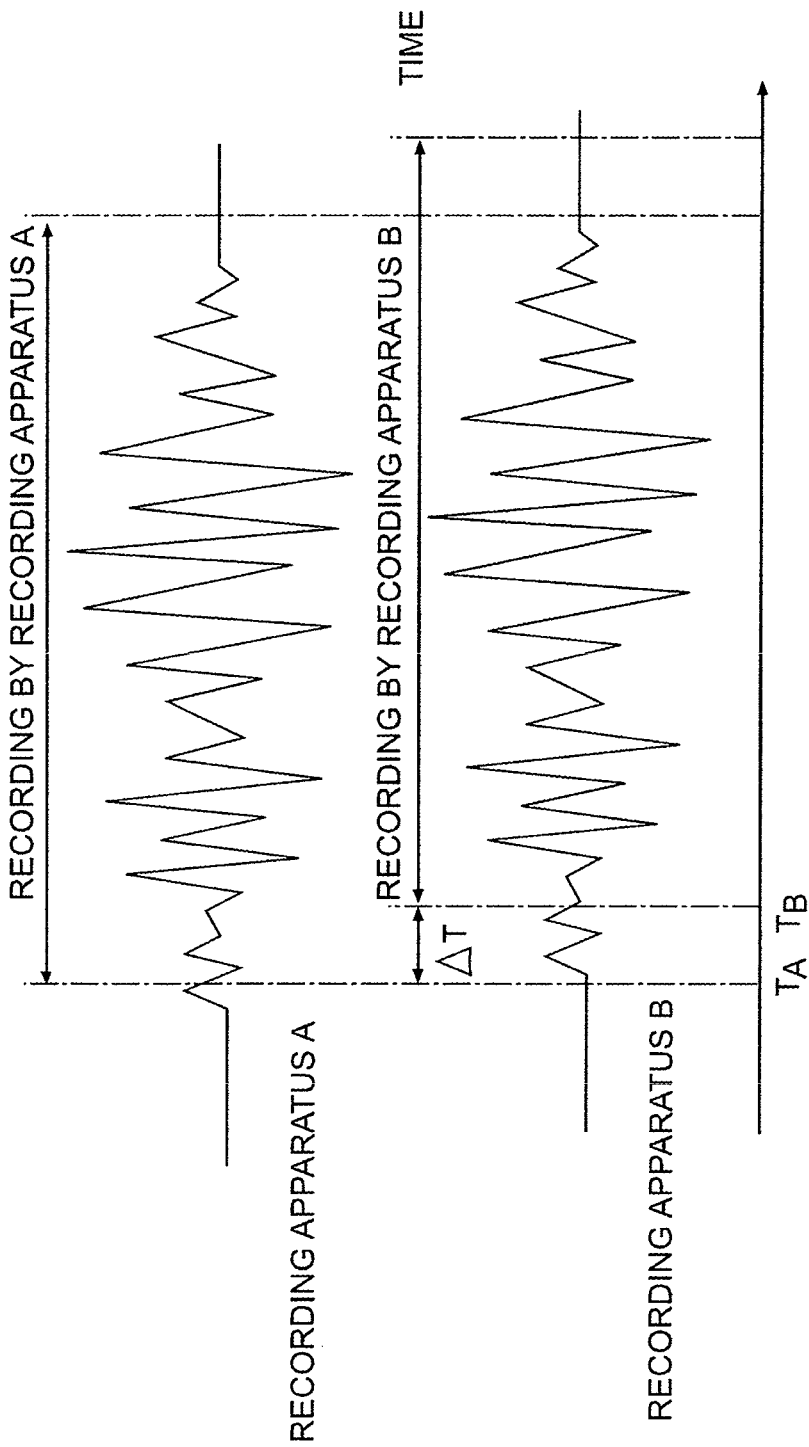
FIG. 6 illustrates a conventional synchronization method.

FIG. 5 is a flowchart illustrating the time calibration process executed by each of the seismographs 10A and 10B, which configure the synchronous recording system 100.

When the time calibration is started, each of the controllers 7A and 7B determines, at step S21, whether it has entered a time calibration period based on a current time signal input from the timer 2. When it is determined that it is not the time calibration period (step S21; No), the controllers 7A and 7B return to step S21 and repeat the process. When it is determined that it is the time calibration period (step S21; Yes), the controllers 7A and 7B determine whether there is any time discrepancy between the time signal of the GPS signal and the time signal indicating the current time measured by the timers 2. When there is no time discrepancy (step S22; No), the process is completed. When it is determined that there is a time discrepancy (step S22; Yes), the controllers 7A and 7B generate time calibration signals based on the received time signals of the GPS signals at step S23. The controllers 7A and 7B perform time calibration that adjusts the current time of the timers 2 to the time based on the time calibration signals at step S24.

According to a non-limiting feature of the synchronous system and synchronous recording of the present disclosure as described above, the recording start time is designated by the synchronous information. Therefore, it is possible to easily synchronize recording and obtain recording that is perfectly synchronous, thereby attaining the high accuracy of the system. Further, since the data within the data buffer 4 is used, and thereby eliminating the adverse effect of the transmission delay, the distance limitation between the seismographs 10A and 10B is eliminated. Therefore, it is possible to improve the usability. In other words, even when the recording apparatuses are remotely located, which may require the use of a telephone line, it is possible to obtain a recording that is precisely synchronized. In addition, since the data within the data buffer 4 is used, it is possible to obtain a synchronized recording retrospectively. Furthermore, since the recording is started by the synchronous information, the effect of noise is prevented unlike the signal, thereby improving the system reliability.

Since the time of the timer 2 is calibrated based on the time signal of the GPS signal, it is possible to calibrate the times of the timers 2 of the seismographs 10A and 10B at the same timing.

Further, since the oscillation data is recorded in the data buffer 4 in association with the time information at each of the seismographs 10A and 10B, it is possible to designate an arbitrary time from a remote operation, and freely retrieve and analyze the oscillation data of the time, thereby improving the usability.

The seismograph measuring system according to a non-limiting feature of the present disclosure is not limited to the above described configuration and modifications can be made. For example, the timing of transmitting the synchronous information may be set after an oscillation at or above the predetermine threshold value H is detected ($T_a$ in FIG. 3) and the oscillation has decreased to a predetermined level or less for a predetermined duration of time t or longer ($T_c$ in FIG. 3). In other words, after oscillation at the predetermined threshold or above is detected, and when the oscillation at the predetermined value or above continues, the synchronous information is transmitted after the oscillation has ceased. Accordingly, the synchronous information is transmitted after the status has calmed down with little oscillation imposed on the seismographs 10A and 10B. Therefore, it is possible to prevent the communication error and improve the high accuracy of the system. The time signal input does not have to be from a GPS satellite. For example, a time announcement signal may be used.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A synchronous recording system, comprising:
a first recording apparatus; and
at least one second recording apparatus, each second recording apparatus being connected to the first recording apparatus through a communication line; wherein:
the first recording apparatus comprises:
a first oscillation detector that detects oscillation as first oscillation data;
a first time receiver that receives time information;
a first data buffer that adds the time information to the first oscillation data to generate first composite data, and records the first composite data; and
a synchronous information transmitter that transmits synchronous information to the second recording apparatus, the synchronous information including a designated recording start time that corresponds to a designated time in the time information; and
the second recording apparatus comprises:
a second oscillation detector that detects oscillation as second oscillation data;
a second time receiver that receives the time information;
a second data buffer that adds the time information to the second oscillation data and records second composite data;
an involatile recorder that records designated second composite oscillation data that was previously recorded in the second data buffer;
a synchronous information receiver that receives the synchronous information transmitted from the synchronous information transmitter; and
a recording controller that starts recording of the designated second composite oscillation data in the involatile recorder from the designated recording start time,
wherein the designated second composite oscillation data recorded in the involatile recorder starts being recorded at the designated recording start time that was included in the synchronous information, and is associated with second composite oscillation data that was recorded in the second data buffer at a time earlier than an actual time that the recording controller starts recording the designated second composite oscillation data into the involatile recorder.

2. The synchronous recording system according to claim 1, wherein each of the first recording apparatus and the second recording apparatus comprises:
a timer; and
a time calibrator that calibrates time of the timer based on the time information received by one of the first time receiver and the second time receiver.

3. A synchronous recording method using to the synchronous recording system of claim 1, comprising:

transmitting synchronous information from the first recording apparatus to the second recording apparatus, the information designating time of detecting oscillation at or above a predetermined level as a recording start time;

receiving, by the second recording apparatus, the transmitted synchronous information; and recording the oscillation data in the involatile recorder from the designated recording start time, the data being recorded in the second data buffer, based on the received synchronous information.

4. A synchronous recording method using the synchronous recording system of claim 2, comprising:

transmitting synchronous information from the first recording apparatus to the second recording apparatus, the information designating time of detecting oscillation at or above a predetermined level as a recording start time;

receiving, by the second recording apparatus, the transmitted synchronous information; and recording the oscillation data in the involatile recorder from the designated recording start time, the data being recorded in the second data buffer, based on the received synchronous information.

* * * * *

UNITED STATES PATENT AND TRADEMARK OFFICE
CERTIFICATE OF CORRECTION

PATENT NO.       : 8,760,963 B2                                     Page 1 of 1
APPLICATION NO.  : 12/794856
DATED            : June 24, 2014
INVENTOR(S)      : Koji Mizutani et al.

It is certified that error appears in the above-identified patent and that said Letters Patent is hereby corrected as shown below:

In the Claims

In column 8, line 66 (claim 3, line 1), please change "using to the" to read -- using the --.

Signed and Sealed this
Twenty-first Day of April, 2015

Michelle K. Lee
*Director of the United States Patent and Trademark Office*